Patented Feb. 7, 1933

1,896,457

UNITED STATES PATENT OFFICE

HEINRICH MORSCHEL, OF COLOGNE-DEUTZ, AND WILHELM LUCE, OF HOFHEIM-ON-THE-TAUNUS, GERMANY, ASSIGNORS TO GENERAL ANILINE WORKS, INC., OF NEW YORK, N. Y., A CORPORATION OF DELAWARE

2.7-DIHYDROXYNAPHTHALENE-3.6-DICARBOXYLIC ACID

No Drawing. Application filed January 5, 1932, Serial No. 584,898, and in Germany January 12, 1931.

The present invention relates to a new hydroxynaphthalene-carboxylic acid, more particularly it relates to the 2.7-dihydroxynaphthalene-3.6-dicarboxylic acid which may be represented by the following formula:

Our new hydroxynaphthalene-carboxylic acid is obtainable by reacting with carbon-dioxide under superatmospheric pressure upon the alkali metal salts of 2.7-dihydroxynaphthalene at a temperature of at least 250° C., say at temperatures between 250 and 350° C. Otherwise the 2.7-dihydroxynaphthalene-3.6-dicarboxylic acid is obtainable by causing carbon-dioxide to act under superatmospheric pressure upon a mixture of 2.7-dihydroxynaphthalene and an alkali metal carbonate at a temperature between about 250 and 350° C.

Instead of starting with the 2.7-dihydroxynaphthalene, the process can be carried out in an analogous manner by starting with the 2.7-dihydroxynaphthalene-3-carboxylic acid, which has been described in literature (compare Ber. d. Deutschen Chem. Gesellschaft, vol. 26, 1893, page 1117).

The free acid is isolated in the usual manner by dissolving the reaction mass in water and acidifying the solution, for example with a mineral acid.

From unchanged 2.7-dihydroxynaphthalene-3-carboxylic acid or from some monocarboxylic acid formed in the reaction, the 3.6-dicarboxylic acid can be easily separated due to its property of being more difficultly soluble in water than the monocarboxylic acid, said process of working up the reaction mass being more fully described in the examples.

The new 2.7-dihydroxynaphthalene-3.6-dicarboxylic acid is a yellowish substance, decomposing at temperatures above 300° C., difficultly soluble in water, more easily soluble in aqueous alkalies and is a valuable intermediate product in the manufacture of dyestuffs.

The invention is illustrated by the following examples, but is not limited thereto:

Example 1.—The dipotassium salt of 2.7-dihydroxynaphthalene is heated for 10 hours at 280° C. and under a carbon-dioxide pressure of 40 atmospheres. The reaction product is allowed to cool, is dissolved in a large quantity of hot water and filtered from impurities. On acidifying the hot filtrate the 2.7-dihydroxynaphthalene-3.6-dicarboxylic acid is precipitated. From the mother liquor there separate on cooling the more easily soluble 2.7-dihydroxynaphthalene-3-carboxylic acid and some unchanged 2.7-dihydroxynaphthalene. With pyridine free from water, the 2.7-dihydroxynaphthalene-3.6-dicarboxylic acid forms a difficultly soluble pyridinium salt. The free acid dissolves in aqueous caustic alkalies and in aqueous alkali metal carbonates with a yellowish-brown coloration. Its alkali metal salts are less soluble than those of the monocarboxylic acid salts and can be separated rather quantitatively from the aqueous solutions by the addition of common salt.

Example 2.—A mixture of 1 part by weight of 2.7-dihydroxynaphthalene and 3 parts by weight of potassium carbonate is heated for 16 hours at 340° C. under a carbon-dioxide pressure of 60–80 atmospheres. After cooling the reaction product is dissolved in hot water and filtered from impurities. On acidifying the filtrate, the 2.7-dihydroxynaphthalene-3.6-discarboxylic acid is precipitated.

Example 3.—The tripotassium salt of 2.7-dihydroxynaphthalene-3-carboxylic acid is heated for 15 hours at 280° C. under a carbon-dioxide pressure of 50 atmospheres. The reaction product is worked up as described in Example 1.

Example 4.—One molecular proportion of 2.7-dihydroxynaphthalene is dissolved in two molecular proportions of aqueous caustic soda lye. The solution is evaporated to dryness and the disodium salt thus obtained is carefully freed from water. The salt free from water is treated with carbon-dioxide at a temperature of 230° C., while stirring. When the carbon-dioxide pressure has reached 45 atmospheres, the temperature is raised to 300° C. and kept at this temperature for 4 hours, while stirring and maintaining a carbon-dioxide pressure of 45 atmospheres. The reaction product is worked up as described in Example 1.

We claim:

1. As a new product the 2.7-dihydroxy-naphthalene-3.6-dicarboxylic acid of the following formula:

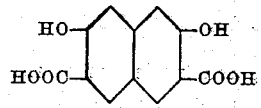

being a yellowish substance, difficultly solable in water, more easily soluble in aqueous alkalies and being a valuable intermediate product in the manufacture of dyestuffs.

In testimony whereof, we affix our signatures.

HEINRICH MORSCHEL.
WILHELM LUCE.